Jan. 14, 1936.   H. SCHICHT   2,027,621
METHOD OF AND MACHINE FOR PRODUCING HOB CUTTERS
Filed Aug. 20, 1932   6 Sheets-Sheet 1

Inventor
H. Schicht

Jan. 14, 1936.                H. SCHICHT                2,027,621
          METHOD OF AND MACHINE FOR PRODUCING HOB CUTTERS
                  Filed Aug. 20, 1932        6 Sheets-Sheet 2

Inventor

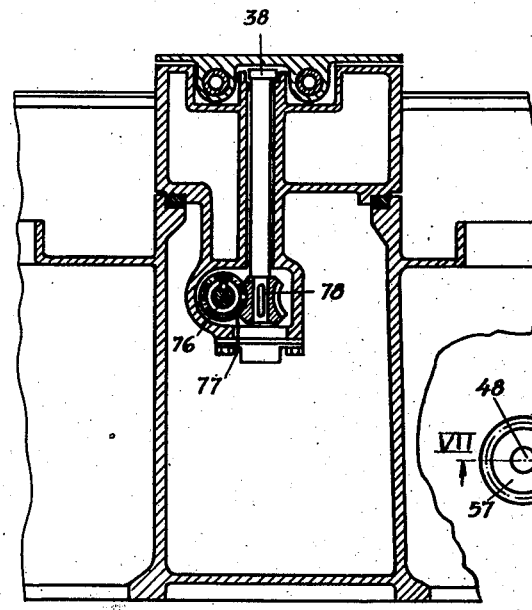
Fig. 5
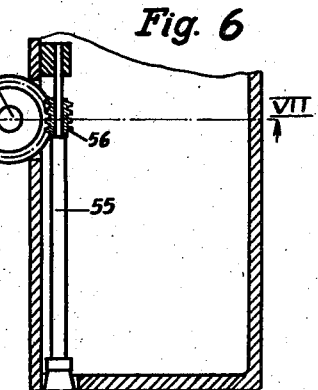
Fig. 6
Fig. 7
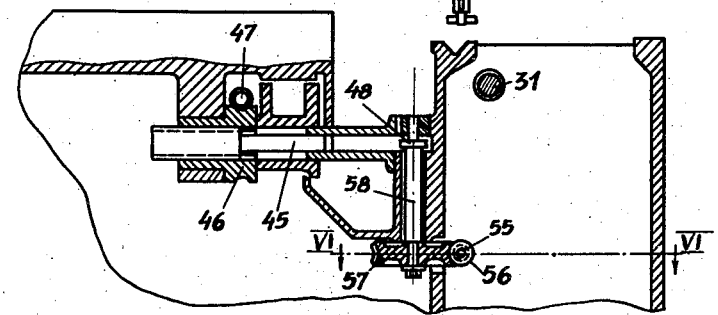
Fig. 8
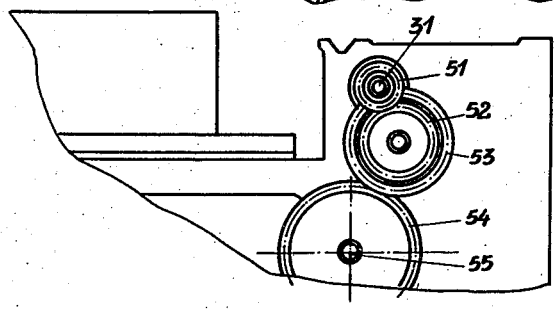
Inventor
H. Schicht Jan. 14, 1936.  H. SCHICHT  2,027,621
METHOD OF AND MACHINE FOR PRODUCING HOB CUTTERS
Filed Aug. 20, 1932  6 Sheets-Sheet 4

Jan. 14, 1936.   H. SCHICHT   2,027,621
METHOD OF AND MACHINE FOR PRODUCING HOB CUTTERS
Filed Aug. 20, 1932   6 Sheets-Sheet 5
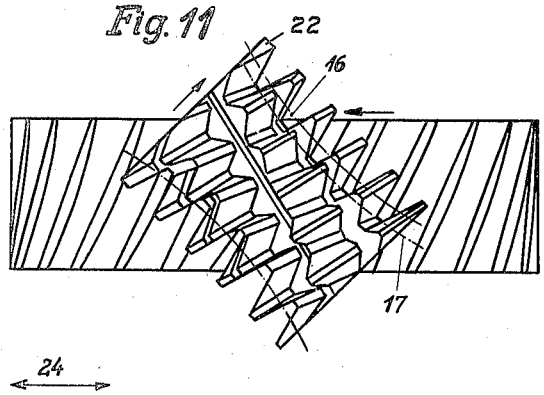
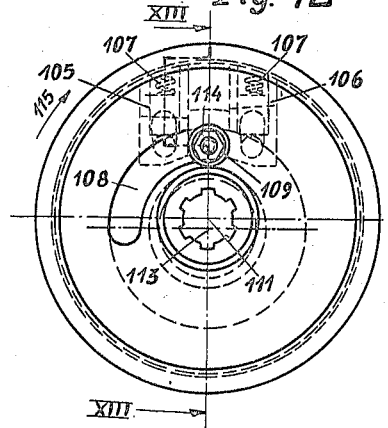
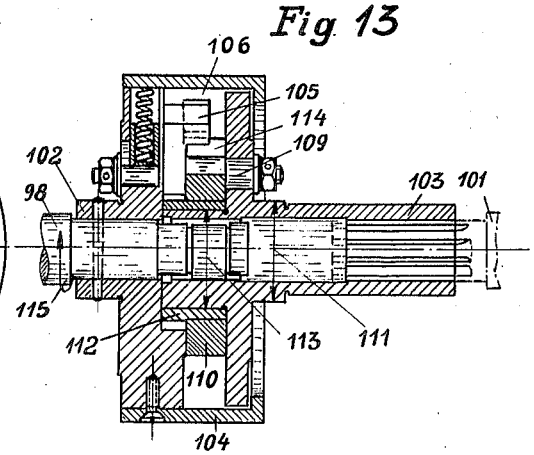
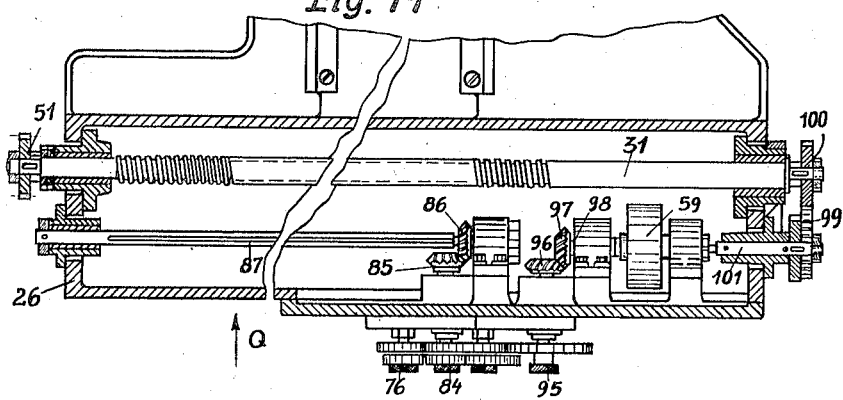

Patented Jan. 14, 1936

2,027,621

UNITED STATES PATENT OFFICE 2,027,621

METHOD OF AND MACHINE FOR PRODUCING HOB CUTTERS

Heinrich Schicht, Huckeswagen, Germany, assignor to the firm W. Ferd. Klingelnberg Söhne, Remscheid-Berghausen, Germany Application August 20, 1932, Serial No. 629,685
In Germany August 28, 1931

16 Claims. (Cl. 51—45)

The invention relates to a method of and machine for relieving the flanks of single and multiple thread spur and spiral gear hobs having concavely curved pitch and bottom surface lines. The hobs to be ground are used for cutting spur and spiral gears having teeth of unequal thickness the latter being of the same dimension at the ends of the width of tooth while increasing towards the center portion of the width of tooth. Such gears having unequal tooth thicknesses offer the advantage of running quietly in mesh with each other even when displaced from their corect positions, i. e. they are insensitive to assembling errors and elastic deflections of their bearings.

Gears of this description are cut by a hob cutter having teeth which, as measured on a straight line parallel with the cutter axis, are thinner at the center portion of the cutter length than at its ends, in other words: the cutter must be provided with concave pitch and bottom surface lines (Fig. 11).

The production of such concave pitch and bottom surface lines of the hob cutter, necessitates the application of a special machine which constitutes the subject-matter of the present invention.

Another object of the invention consists in a method of and a machine for making hob cutters with concave pitch and bottom surface lines, a tool being employed to which is imparted an additional movement relative to the hob, apart from the relieving movement proper.

A further object of the invention relates to a method of and a machine for producing hob cutters with concave pitch and bottom surface lines, means being provided for eliminating the relieving and relative movements of the tool so that cutters with straight surface lines, such as worm gear hobs, and worms may also be ground with the relieving operation omitted.

The accompanying drawings illustrate the machine and its main components.

Fig. 5 is a partial section V—V (Fig. 4) taken through the rear of the machine bed.

Fig. 6 is a partial section VI—VI (Fig. 7) showing the drive of the cam template.

Fig. 7 is a partial section VII—VII (Fig. 6) taken through the drive of the cam template.

Fig. 8 is a partial view as seen in the direction of the arrow L (Fig. 2) showing the arrangement of the change gears for the cam drive.

Fig. 11 shows the hob cutter with concave pitch and bottom surface lines engaging with the gear to be hobbed.

Fig. 12 is a front view of an indexing clutch (59) of the hob cutter relieving machine.

Fig. 13 is a section taken on line XIII—XIII of Fig. 12 through the same clutch 59 of the hob cutter relieving machine.

Fig. 14 is a partial section XIV—XIV (Fig. 4) taken through the machine bed.

Figure 1:
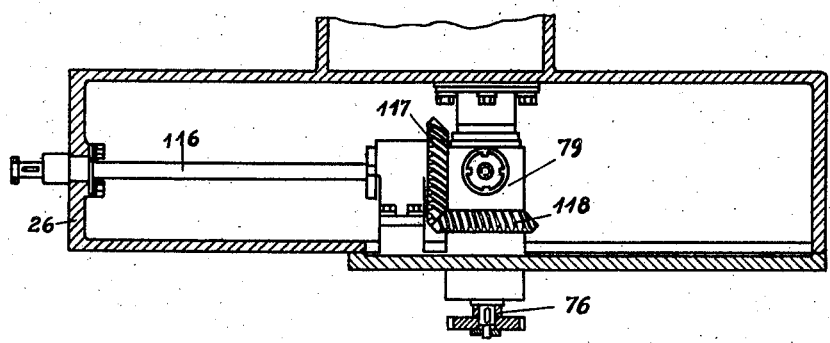
Fig. 1 is a partial section I—I (Fig. 4) taken through the machine bed.
Figure 2:
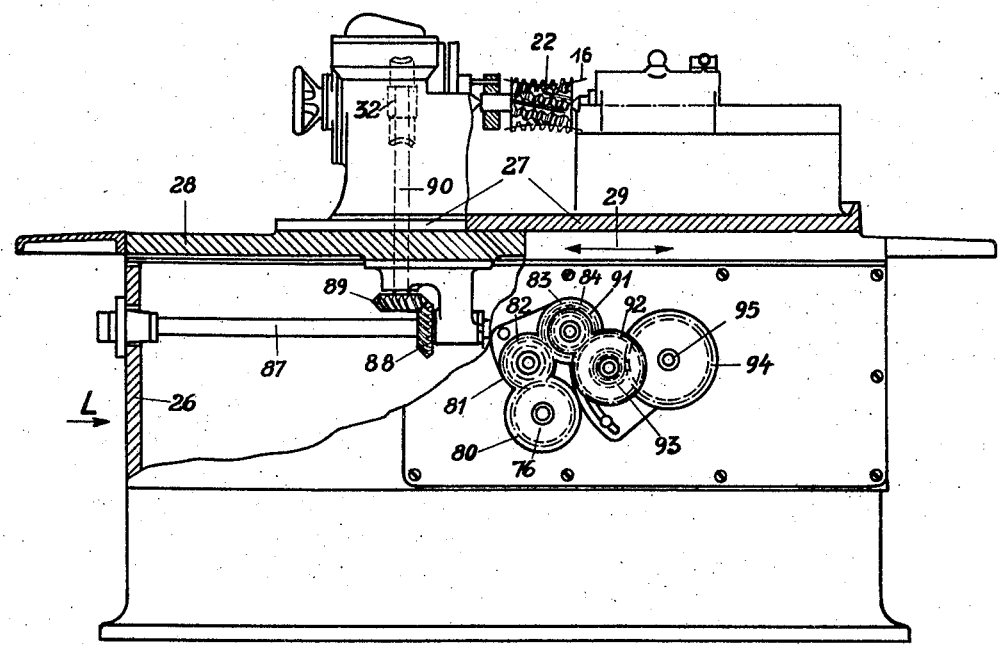
Fig. 2 is a front view of the machine with a partial section on line II—II (Fig. 4).

With the exception of the relieving operation the cutter used for toothing the spur and spiral or helical gears described above is produced by well-known methods. Relief turning or milling and relief grinding the tooth profiles, respectively, are accomplished by the use of two machines designed along the same principle. The hob cutters may be either relief turned in the normal way by using a known backing off lathe, or they may be relief turned or relief milled with the aid of a special relief turning or relief milling machine designed in conformance with this invention. This machine is also applicable as a relief-grinding machine by substituting a grinding wheel running at a higher speed for the turning tool or milling cutter, and by increasing the speed of the machine drive to suit requirements. In the drawings, Figs. 1 to 16, as well as in the following description, one embodiment of several possible machine designs will be explained in principle by way of example.

The general construction of the machine is as follows.

On a T-shaped machine bed 26 (Fig. 4), the work head stock 27 integral with the tailstock guides is mounted on the slide 28 the latter moving on the ways of the bed. A duplex tool rest 33—34 is movably mounted on that part of the bed which is at right angles to the slide ways. The lower slide 33 guided on steel ways 39 reciprocates by means of a pressure oil piston 42 moving within a cylinder 41 (Fig. 9) in the direction of the arrows 43 and 44. The length of travel in the direction of the arrow 43 is limited by a fine adjustable dog 45 (Fig. 7) abutting against the cam 48 to be described later. In the direction of the arrow 44, the length of stroke is limited by a fixed stop. Fine adjustment of the dog 45 is made by means of the nut 46 and the worm 47 connected to a hand wheel and ratchet wheel. The ratchet wheel is rotated by a pawl actuated from a hydraulic piston. By this arrangement, the tool may be advanced towards the work to the desired depth of each next cut while it is on the return stroke. The movements of the slide 33 serve for adjusting the turning, milling or grinding tool to the depth of cut to be taken, for withdrawing the slide including the turning or milling or grinding head at the end of each operation, and for feeding the turning tool, or milling cutter or grinding wheel towards the work, at the beginning of each operation. The upper slide 34 moves on tubular guides 36 serving as pressure oil piston, and cylinder. The pressure oil supplied to this cylinder forces the slide against a cam 38, see Fig. 5, which causes the slide to follow the relieving stroke of the cutter to be relieved. On the upper slide, a turning, or milling or grinding attachment 35 (see Fig. 4, or Figs. 15 and 16) may be mounted, each attachment having its special purpose design, as will be described later, depending on the kind of tool used. This may be either a milling cutter or a grinding wheel of the finger or disk-shaped type or a turning tool with trapezoidal cross section. The machine bed houses the mechanical drive of the machine. the machine is driven from a motor 60 (Figs. 3 4) which also drives an oil pump supplying the pressure oil for the automatic control. The revolving cutter or grinding wheel 119 (Fig. 4) or 133 (Figs. 15 and 16), is driven either directly from a motor or by means of bevel gears or belting. When a turning tool is used, it is clamped in a chuck. Six groups of change gears are available to change speeds and to adjust the number of work revolutions in the proper ratio with both the table speed and number of revolutions of the relieving cam 38 and control cam 48.

Figure 3:
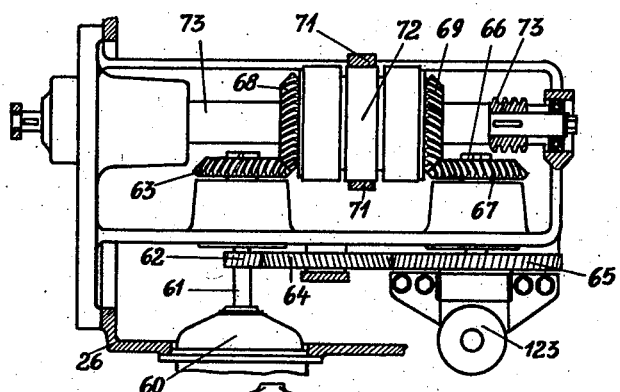
Fig. 3 is a partial section III—III taken through the rear of the machine bed (Fig. 4).
Figure 4:
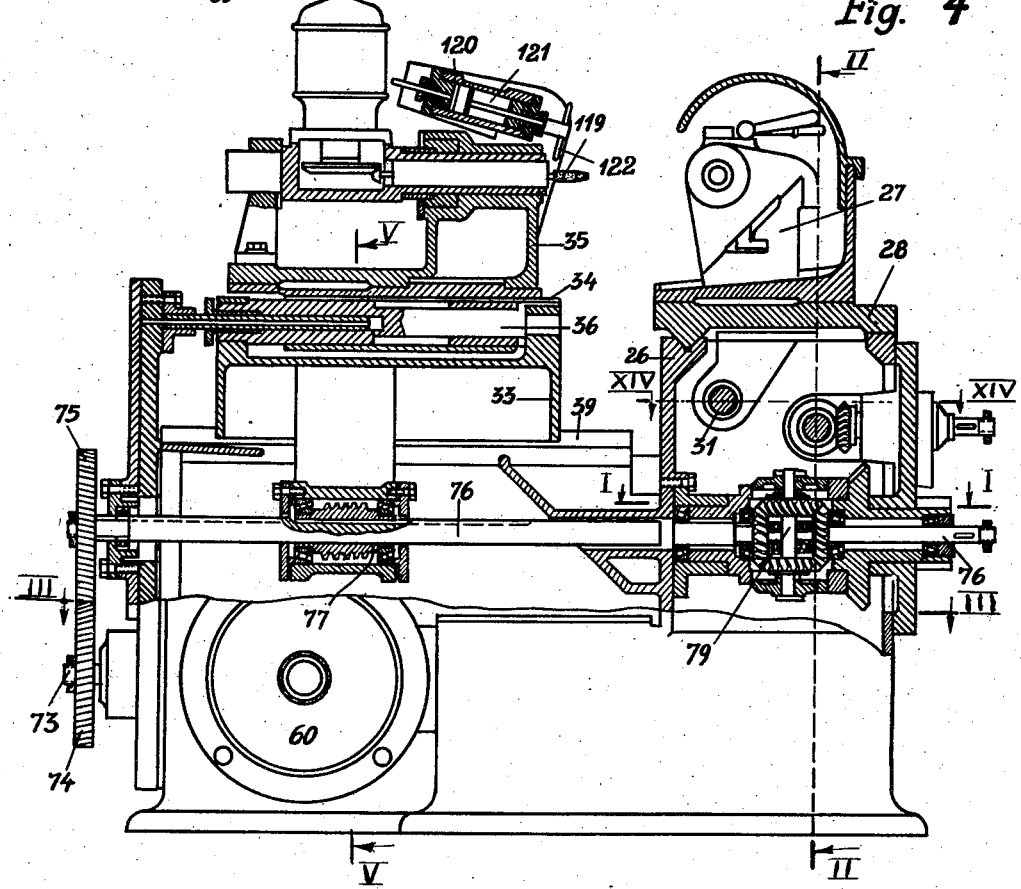
Fig. 4 is a cross section taken through the whole machine.
Figure 9:
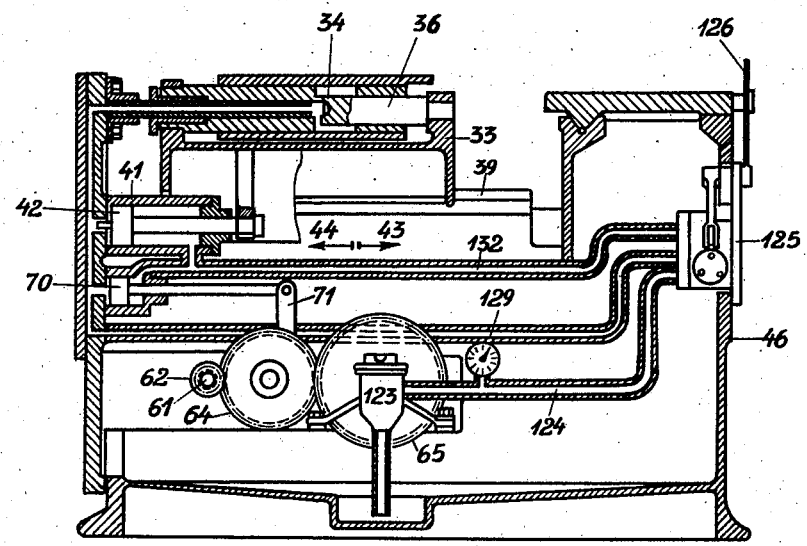
Fig. 9 is a cross section taken through the rear part of the machine with the duplex tool rest.
Figure 10:
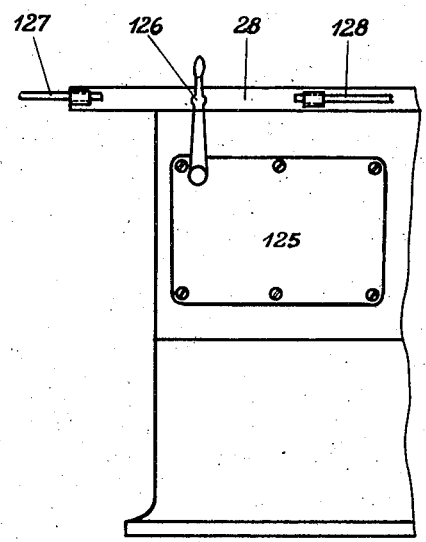
Fig. 10 is a partial view in the direction of the arrow Q (Fig. 14) showing the means for controlling the oil circulation.

From the motor 60, the mechanical drive of the machine is transmitted to the shaft 61 (Figs. 3 and 4). This shaft carries a spur gear 62 and a bevel gear 63. The spur gear 62 meshes with the intermediate gear 64, and the latter with a spur gear 65 mounted on the shaft 66 which carries the bevel gear 67. The bevel gears 63 and 67 mesh with the bevel gears 68 and 69, respectively. The bevel gears 63 and 68 revolve with the same speed as the motor, while the bevel gears 67 and 69 are driven at a reduced speed, e. g. one fifth of the motor speed. A frictional clutch 72 (Fig. 3) hydraulically operated by the piston 70 and lever 71 (Fig. 9) is used for coupling either the slow- or the high speed bevel gear 68 or 69 to the shaft 73. Through the pick-off spur gears 74 and 75 (Fig. 4), the shaft 73 is connected to the shaft 76 so that the speed of the entire machine driving unit may be changed. This shaft carries a worm 77 meshing with a worm gear 78 (Fig. 5) which drives the cam 38 actuating the relieving motion of the upper slide 34. The worm 77 is slidably keyed on the shaft 76, as shown in Fig. 4, so as to allow the slide 33 to move on the guides 39 of the machine frame. After having passed the differential gearing 79 (Fig. 1), the shaft 76 is connected to the shaft 84 by means of the pick-off gears 80, 81, 82, 83 (Fig. 2) power being transmitted through the bevel gears 85 and 86 (Fig. 14), shaft 87, bevel gears 88 and 89 (Fig. 2), shaft 90, worm gearing 32 to the work 22. From the shaft 84 the drive is taken through the pick-off gears 91 to 94 to transmit rotation by shaft 95 (Fig. 14), bevel gears 96 and 97, and through the indexing and compensation clutch 59 to be described later, shaft 101, change gears 99 and 100 to the lead screw 31. From the lead screw, the differential shaft 116 (Fig. 1) is driven by change gears, and in addition, through the change gears 51 to 54, shaft 55, worm gearing 56 and 57 and shaft 58 (Figs. 6, 7, and 8), drive is led to the cam 48 which forms an essential component of the invention.

The hydraulic control system contains the oil pump 123, (Figs. 9 and 10) supplying the oil through the pipe 124 to the reversing valve 125 which controls the forward and return motions of the machine. When the lever 126 is shifted over one way by hand or by the action of the reversing dogs 127 and 128 attached to the machine table 28. the pressure oil is fed into the pipe 129, whence it is passed to the reversing piston 70 actuating the clutch 72, and also to the piston 42 of the lower slide and to the piston 36 of the upper slide 34. With this lever position, the working cycle of the machine is started, the lower slide 33 being advanced towards the work and forced against the control cam 48, while the upper slide 34 is forced against the relieving cam 38 (Fig. 5).

When the lever 126 is shifted over the other way, the pressure oil is fed into the pipe 132 while the pipe 129 is connected to the oil tank. Hence, the clutch 72 is reversed for the quick return motion of the machine, and both upper and lower slides are withdrawn from the work and relieving cam. During the return motion of the machine, pressure oil is likewise supplied to the wheel truing device to be described later and also to a device which automatically advances the grinding wheel to the truing diamond and another device which adjusts the tool to the desired depth of cut.

A feature forming a subject matter of the invention is the control cam 48 (Fig. 7) mentioned above. The cam is driven from the lead screw through a train of change gears in such a manner that it has completed a given fraction of one revolution when the work has moved past the tool. Since, during operation, the duplex rest is permanently forced against the cam 48 under the action of the pressure oil, the revolving cam causes the milling cutter or grinding wheel to follow the curved pitch and root surface lines 16 and 17, respectively (Fig. 11).

Another important device covering the range of invention is the mentioned indexing and compensating clutch 59. The latter acts in such a way that, when the mechanical drive of the machine is reversed from forward to quick return motion, the rotation of the shaft 101 is caused to be delayed with respect to that of the shaft 98 by one full revolution. By this arrangement the clutch is made to act as a positive, accurate and simple indexing device to be used in turning, grinding or milling multiple-thread worm-shaped work pieces, such as hog cutters and worms. By having the clutch 59 arranged between the work and lead screw drives, and with the use of the indexing change gears 91 to 94 (Figs. 2 and 14), it will be possible to transmit the one full revolution by which the rotation of the shaft 101 is delayed with respect to that of the shaft 98, in such a ratio that, when the machine drive is reversed, the work continues rotating by the desired fraction of one revolution while the lead screw stops for a short time.

The technical progress of this kind of indexing lies in the fact that a complicated indexing apparatus with all its adhering sources of errors may be avoided.

This clutch offers another advantage in that, with each commencement of the operating cycle, the trains of change gears are caused to occupy another relative position. Thus, at the beginning of each successive cycle, the position of the tool relative to the work is made to be axially displaced towards the left or right by the distance of a few thousandths of a millimeter. Since, however, due to inaccuracies of the lead screw and change gears, the tool is not advanced in a perfectly uniform manner during operation, but subjected to slight irregularities, the lead of the work will not be perfectly uniform with one operating cycle. Because of the minute changes of the initial positions of the tool relative to the work taking place with each commencement of a new operating cycle, such slight irregularities are made to act on another portion of the work so that, with the multiple passages of the tool, the slight errors will be compensated or neutralized, a perfectly uniform lead of the work being obtained with the aid of the clutch.

The technical progress of this invention, therefore, lies in the fact that, by arranging the clutch in the drive between work and lead screw, compensation or neutralization of inevitable irregularities of lead screw and change gears will be obtained.

Obviously, the principle of the clutch is capable of being applied to all such devices and machines as backing-off lathes, engine lathes and the like, where indexing accuracy plays an important part or where lead and indexing errors are to be equalized by turning the driving members against each other.

In the following, a detailed description (Figs. 12 and 13) of the clutch 59 will be given.

The clutch member 102 is securely mounted on the driving shaft 98. The clutch member 103 drives the shaft 101. Both clutch members are protected from the entrance of dirt by means of the housing 104. The dog drivers 105 and 106 are adjustable within the driving clutch member 102 and forced towards the center of the clutch 102 by means of springs 107. The other clutch member 103 extends over the stub of the shaft 98 on which it is free to rotate by means of needle bearings. The flange of the clutch member 103 has an eccentric groove 108 through which extends a bolt 109 of the cam plate 110. The cam plate 110 is mounted on a plain bearing 112 which is eccentric to the shaft axis 111 and may be eccentrically rotated round the center line 113 of the hub of the clutch member 103. By turning the cam 110 relatively to the clutch member 102, the catch 114 is moved outwards through the action of the eccentric groove 108 so that it engages with the dog 106 of the other clutch member. The clutch operates as follows:

Whilst the driving shaft 98 is rotating in the direction of the arrow 115, positive engagement is maintained between the dog driver 105 and the catch 114 so as to drive the clutch member 103.

When the direction of rotation of shaft 98 is reversed, the dog driver 105 is disengaged from the catch 114 the drive clutch member 103 together with the catch ceasing to rotate until the dog driver 105, after completion of approximately one full revolution, is pushed against the catch 114 and causes continued rotation of the latter with the cam plate 110. Because of the eccentric bearing of the cam plate 110 and through the action of the eccentric cam groove 108, the catch 114 is moved outwards. With continued rotation, the spring-actuated dog driver 105, jumps over the catch and drops back behind the latter to its initial position, while the second dog driver 106 rests against the catch 114 which now interferes with its path, thus starting again the drive of the clutch member 103. When the direction of rotation is again reversed to that of the arrow 115 it is the dog driver 105 rather than the dog driver 106 that rests against the catch 114, so as to turn the cam plate 110 back to its initial position and then again drive the clutch member 103. During the time interval beginning from the reversal from operation to return motion and ending with the recommencement of the operating cycle, the rotation of the shaft 98 has been advanced against that of the shaft 101 by exactly one revolution. To relief-mill or relief-grind spiral-fluted cutters, the differential gearing 79 is driven from the lead screw 31 through change gears, shaft 116 and bevel gears 117, 118 (Fig. 1).

An additional attribute of the machine is that, by the use of various types of tools and therefore various tool heads to be mounted on the duplex tool rest, as well as by the elimination of some mechanism, it is universally, adapted for machining a variety of worm-shaped pieces, such as cylindrical single- and multiple-thread spur and worm gear hobs having curved or straight pitch surface lines, and likewise single- or multiple-thread worms.

Such work pieces may be turned, milled or ground, relief-turned, relief-milled, or relief-ground on the machine.

When the control cam 48 is eliminated by omitting the change gears 51 to 54, hob cutters with straight surface lines may be relief-turned, relief-milled or relief-ground.

When in addition, the relief-movement is eliminated by inserting a bolt between the upper and lower slides (34, 33), single- or multiple-thread worms may be turned, milled or ground on the machine.

When using the machine as a standard grinding machine, the productive capacity will depend to a large extent on the size and kind of the grinding wheels.

When grinding or relief-grinding is done by a finger-type wheel, a grinding attachment 35 (Fig. 4) is employed. The attachment which is pivoted on a vertical axis may be mounted on the upper slide 34 and clamped to it in the adjusted position. By means of an eccentric bushing, the grinding wheel may be so adjusted in a vertical direction parallel with its axis that the axis of the finger wheel intersects with the work axis at right angles. The sectional cut taken through the axis of the finger wheel presents a trapezoidal profile conforming with the tooth space to be ground. Preferably, the cone angle of the wheel profile is made equal to the flank angle of the trapezoidal tooth of the worm-shaped work to be ground.

Figure 15:
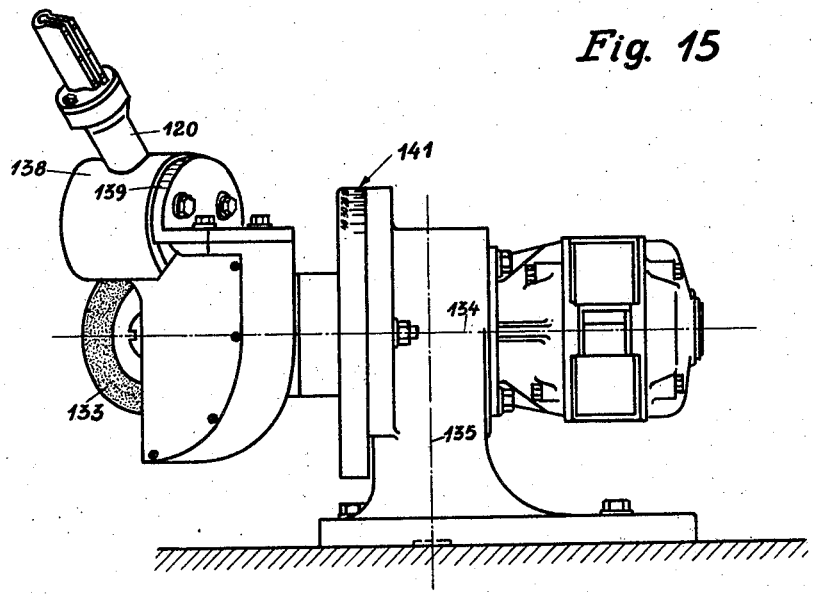
Fig. 15 is a side view of the exchangeable grinding head equipped with conical disk wheels.
Figure 16:
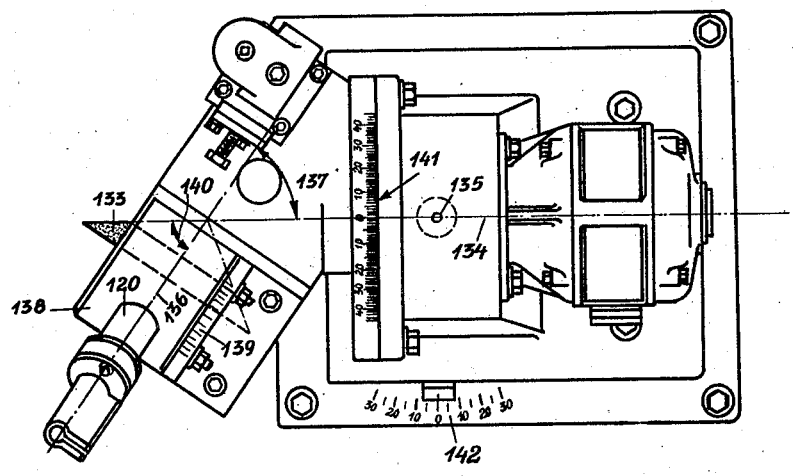
Fig. 16 is a plan view of the exchangeable grinding head equipped with conical disk wheels.

When grinding or relief-grinding is made with a disk-shaped wheel, use is made of a grinding attachment shown by Figs. 15 and 16. The wheel 133 has the shape of a truncated cone.

The grinding attachment which is bolted to the upper slide 34 (Fig. 4) allows of swivelling the wheel round a horizontal axis 134, and in addition, it is pivoted on a vertical axis 135. The axis 136 of the grinding wheel 133 includes an angle 140 with the horizontal axis 134 (Fig. 16). The wheel is so adjusted that its cone surface line is in alignment with the horizontal axis 134 of the grinding attachment.

This arrangement permits of making the various adjustments necessary for grinding different thread profiles whether curved or practically trapezoidal as viewed in the axial section. In the latter case, e. g. the working surface line of the cone wheel is set to the angle of thread helix at the root of the thread by swivelling it round the horizontal axis 134 (readings being taken on the graduation 141); and in addition, the entire attachment is swivelled round the vertical axis 135 (readings being taken on the graduation 142) and adjusted to the pressure angle due consideration being given to take care of a certain angular correction.

During the return motion of the machine, truing of the grinding wheel whether of the finger or disk shape is made in a straight line.

Essentially, the truing device is the same for the two kinds of wheels and consists of a cylinder 120 (Figs. 4 and 15) and a piston 121 which is reciprocated in a straight path by means of oil pressure. At one end, the piston carries the truing diamond 122. The whole apparatus may be swivelled to adjust the straight path of the diamond under the angle required for truing the wheel. The angular adjustment made on the housing 138 which receives the truing device may be read off from a graduated scale 139 (Fig. 15), or else, the required angle may be also adjusted by means of precision gauge blocks. The truing device is so fastened to the spindle box that it cannot be moved except by swivelling. The grinding wheel is movable in an axial direction within the spindle box either by hand or by oil pressure which acts on a suitable feeding device to feed the wheel towards the path described by the truing diamond by an amount to suit compensation for wheel wear. This arrangement provides for maintaining a permanent sharp condition as well as a permanent adjustment of the grinding wheel in the once set position.

What I claim is:

1. A machine for relieving the teeth of helical hobs having threads with concave pitch and root lines, comprising a work slide having a rotatable work support thereon; a tool support having a tool fixed thereon; a bed upon which the work slide is slidable in the direction of the axis of the work piece, and upon which the tool support is slidable in a direction perpendicular to the axis of the work piece; means for turning the work piece about its axis; means for displacing the work slide along the tool in the direction of the work piece axis; means for displacing the tool support perpendicular to the work piece axis for adjusting the working depth of the tool on the work piece; means for imparting relieving movement to the tool in a direction radial to the work piece axis; and means for imparting an additional radial movement to the tool with respect to the work piece and at such a ratio to the velocity at which the work piece is moving along the tool, that the tool follows concave pitch and root lines and generates teeth of varying thickness on the work piece.

2. A machine for relieving the teeth of helical hobs having threads with concave pitch and root lines and having teeth of varying thickness, comprising a work slide upon which the hob blank is rotatably secured; a bed upon which said slide is mounted for movement along the work axis according to the lead of the thread being generated; upper and lower tool supports, the upper support being slidable on the lower support; a relieving cam; fluid pressure operated means for pressing said upper support against said cam to produce relieving movement of the support in a direction radial to the work piece axis; a second cam; fluid pressure means for moving the lower support against said second cam; and means including change gears operated by movement of the work piece for causing the tool to generate teeth of varying thickness on the work piece and having curved pitch and root lines.

3. A machine for relieving the teeth of helical hobs having threads with curved pitch and root lines and having teeth of varying thickness, comprising a work piece slide adapted to support a rotatable hob blank; a lead screw for operating said work slide; an upper tool support; a relieving cam; fluid pressure operated means for moving said upper support against said cam; a grinding tool on the upper tool support; a lower support slidable on said bed in a direction perpendicular to the axis of the work piece; a second cam; fluid pressure means for pressing said lower support against the second cam; and means including change gears for rotating said second cam in timed relation to the movement of the work piece slide and causing said tool to perform an additional movement radial to the axis of the work piece so that the tool follows the curved pitch and root lines of the hob to be generated.

4. A machine for relieving the teeth of helical hobs having threads with curved pitch and root lines for generating spur and bevel gears with teeth of varying thickness, comprising a work piece slide movable by a lead screw in the direction of the axis of the work piece; an upper tool support slidable on guides in a direction at right angles to the work piece axis; a relieving cam; fluid pressure operated means for pressing said upper support against said cam; a second cam; a lower support; fluid pressure operated means for moving said support against said cam and causing the tool on said support to follow the desired pitch and root lines on the work piece; and fluid pressure operated means including change gears and a clutch for changing from forward to accelerated backward movement in driving the machine mechanism.

5. A machine for relieving the teeth of helical hobs with threads having concave pitch and root lines for generating spur and helical gears with teeth of unequal thickness, comprising a work piece slide movable along the work piece axis; an upper tool support slidable in a direction at right angles to the work piece axis on two guides formed as oil pistons; a rotatable relieving cam; pressure operated means for forcing said upper tool support against said cam; a lower tool support; a second cam; oil pressure means for causing said lower support to engage the second cam and causing the tool to follow the curved pitch and root lines of the work piece; a grinding spindle bearing carried by said upper support; a grinding spindle in said bearing; a grind stone carried by said spindle; a truing device; and means whereby the diamond of said device may be moved along the straight surface line of the grind stone in any desired direction for truing said stone to any desired cone angle.

6. A machine for relieving the teeth of helical hobs having threads with concave pitch and root lines for generating spur and helical gears with teeth of uneven thickness, comprising a work piece slide movable along the tool in the direction of the work piece axis; an upper tool support slidable in a direction perpendicular to the work piece axis on two guides formed as oil pistons; a rotatable relieving cam and pressure oil operated means for pressing said upper support against said cam; a second rotatable cam; a lower support and pressure oil operated means for moving said lower support against said second cam to cause the tool to follow curved pitch and root lines on the work piece; pressure oil control coupling means for changing the driving mechanism of the machine from forward movement to accelerated backward movement; a rotatable grind stone; a truing device including a diamond; pressure oil operated means for moving the diamond along the straight surface line of the grind stone for truing the same; a pressure oil pump; and means for controlling the pressure oil in such a manner that the work piece slide is caused to run backward at an accelerated rate when it reaches the end of its forward travel, and simultaneously therewith the upper and lower supports including the grind stone are drawn away from the work piece, the upper support is disconnected from its cam and the truing device is moved to correct truing position after each grinding traverse.

7. A machine for relieving the teeth of helical hobs having threads with concave pitch and root lines for generating spur and helical gears with teeth of uneven thickness, comprising a work piece slide movable in the direction of the work piece axis and along the tool; an upper tool support slidable in a direction at right angles to the work piece axis on two guides formed as oil pistons; a rotatable relieving cam; fluid pressure operated means for holding said upper support in engagement with said cam; a lower support; a second rotatable cam; fluid pressure operated means for moving said lower support into engagement with said second cam and causing it to follow the tool so as to generate curved pitch and root lines on the work piece; means including change gears and a coupling controlled by fluid pressure for changing the driving mechanism of the machine from forward movement to accelerated backward movement; a bearing on said upper support; a grind stone mounted in said bearing; a truing device including a diamond; fluid pressure operated means for moving the truing device along the straight surface line of the grind stone for truing the same; a pressure oil pump; and a controlling device constructed and arranged to cause the work piece slide to be reversed when it reaches the forward end of its travel and to run backward at an accelerated rate, to simultaneously draw the lower support and the upper support away from the work piece, to withdraw the upper support from engagement with its cam, and for returning the truing device to its correct position after each grinding traverse.

8. A machine for relieving the teeth of helical hobs having threads with concave pitch and root lines for generating spur and bevel gears with teeth of unequal thickness and for working the flanks of worms, said machine comprising a work piece holder mounted for sliding movement relative to a tool; upper and lower tool supports; a relieving cam and a curve cam; oil pressure means for moving the work piece slide and for pressing the supports against said cams to cause the tool to pass along the curved pitch and root lines of the work piece; and means for turning the work piece holder farther during the accelerated return of the machine than during its forward travel.

9. A machine for relieving the teeth of helical hobs having curved pitch and root lines for generating spur and helical gears with teeth of unequal thickness, comprising a machine bed; a work piece holder slidably movable on said bed along the tool; a lead screw for moving said slide; upper and lower tool supports, the upper support sliding on the lower, and the lower support being slidable on the bed in a direction at right angles to the work piece axis; means for moving the work piece slide at a rate which bears a fixed ratio to the thread of the lead screw which moves it; a rotatable relieving cam and a curve cam; fluid pressure operated means for moving said supports against said cams to guide moving the tool along the concave pitch and root lines of the work; and gearing between the curve cam and the work piece slide for driving the curved cam at a fixed rate relative to the rate of sliding and to the amount of the displacement of the work piece slide and conforming to variations in thickness of teeth being cut on the work piece.

10. A machine for relieving the teeth of helical hobs having curved pitch and root lines for generating spur and helical gears with teeth of unequal thickness, comprising a machine bed; a work piece holder slidably movable on said bed along the tool; a lead screw for moving said slide; upper and lower tool supports, the upper support sliding on the lower, and the lower support being slidable on the bed in a direction at right angles to the work piece axis; means for moving the work piece slide at a rate which bears a fixed ratio to the thread of the lead screw which moves it; a rotatable relieving cam and a curve cam; fluid pressure operated means for moving said supports against said cams to guide the tool along the concave pitch and root lines of the work; a threaded spindle having one end engaging the said curve cam; and manual adjusting means including gearing for adjusting said threaded spindle to position both of said supports at the desired distance from the work piece axis, whereby the depth of cut may be adjusted to the thickness of tooth desired.

11. A machine for relieving the teeth of helical hobs having concave curved pitch and root lines for generating spur and helical gears with teeth of varying thickness, comprising a machine bed; a work piece slide movable along a tool on said bed; upper and lower tool supports, the upper support being slidable on the lower; means for moving said lower tool support along said bed at right angles to the axis of the work piece; means for moving the work piece slide in a fixed ratio to the thread which moves it; a rotatable relieving cam; a curve cam; means for pressing said supports against said cams, respectively, so as to guide the tool on said supports along the concave curved pitch and root line of the hob being cut; and a grinding stock including a grinding disk having one of its surfaces beveled and so positioned that the surface line of the cone of the grinding disk passes through the horizontal axis of the grinding stock and permits the grinding disk to be adjusted at the lead angle of the work piece, and so that this horizontal axis is cut by a vertical axis about which the grinding stock can be swung so as to permit the said surface line of the grinding disk to be adjusted to the pressure angle of the tooth flanks to be ground.

12. A machine for relieving the teeth of helical hobs having concave pitch and root lines for generating spur and helical gears with teeth of unequal thickness and for relieving the teeth of worm gear hobs and for working the flanks of worms, comprising a machine bed; a work piece slide movable on said bed; upper and lower tool supports, the upper support being slidable on the lower; means for sliding the lower tool support on said bed perpendicular to the axis of the work piece slide and in a fixed ratio to the actuating thread of said slide; a rotatable relieving cam; a rotatable curve cam; fluid pressure means for pressing said supports against said cams for guiding the tool along the concave pitch and root lines of the hob to be cut; means for stopping rotation of the curve cam; and a stop for preventing the upper support from touching the relieving cam when working flank worms having cylindrical pitch surfaces without relieving.

13. A machine for relieving the teeth of helical hobs having concave pitch and root lines for generating spur and helical gears with teeth of unequal thickness and for relieving the teeth of worm gear hobs and for working the flanks of worms, comprising a machine bed; a work piece slide movable on said bed; upper and lower tool supports, the upper support being slidable on the lower; means for sliding the lower tool support on said bed perpendicular to the axis of the work piece slide and in a fixed ratio to the actuating thread of said slide; a rotatable relieving cam; a rotatable curve cam; fluid pressure means for pressing said supports against said cams for guiding the tool along the concave pitch and root lines of the hob to be cut; means for stopping rotation of the curve cam; a stop for preventing the upper support from touching the relieving cam when working flank worms having cylindrical pitch surfaces without relieving; a grinding disk having a conical surface; means for turning the grinding disk about a surface line of the cone; and means for straight line truing the cone surface of the grinding disk during returning movements of the machine.

14. A machine for relieving helical hobs having concave pitch and root lines, comprising a bed; a work slide movable on said bed; a compound tool slide movable on said bed in a direction at right angles to the axis of the work piece, said slide including two tool supports; a relieving cam and a control cam, each of said cams being in controlling relation to one of the tool supports; and fluid pressure means for operating said tool slides to generate a hob having concave pitch and root lines and teeth of varying thickness.

15. A machine for relieving helical hobs having concave pitch and root lines, said machine comprising a bed; a work piece slide movable across said bed and non-rotatable with respect to said bed; a compound slide, including two tool supports; two cams, one for actuating each of said supports; fluid pressure means for actuating said supports; and means for causing one of said supports to move in timed relation to the movement of the work piece slide to cause the teeth of the work piece to have concave pitch and root lines.

16. A machine for relieving helical hobs having concave pitch and root lines, comprising a bed; a work piece slide movable across said bed and capable of rectilinear motion only; a compound tool slide movable across said bed in a direction at right angles to the axis of the work piece, and also capable of two types of radial movement relative to the work piece axis, one of said movements being a relieving movement and the other a movement in timed relation to movement of the work piece relative to the tool; two cams; and fluid pressure operated means for controlling the actuation of the tool slide by said cams.

HEINRICH SCHICHT.